United States Patent
Katagiri et al.

[19]

[11] Patent Number: 6,100,610
[45] Date of Patent: Aug. 8, 2000

[54] DC MOTOR

[75] Inventors: Masayuki Katagiri; Hiromitsu Takei, both of Nagano, Japan

[73] Assignee: Kabushiki Kaisha Sankyo Seiki Seikakusho, Nagano, Japan

[21] Appl. No.: 09/132,474

[22] Filed: Aug. 11, 1998

[30] Foreign Application Priority Data

Aug. 11, 1997 [JP] Japan ................................. 9-228827

[51] Int. Cl.[7] .......................... H02K 13/10; H02K 15/00
[52] U.S. Cl. ............................ 310/42; 310/269; 310/233
[58] Field of Search ............................ 310/42, 177, 231, 310/233, 234, 235, 236, 237, 261, 269

[56] References Cited

U.S. PATENT DOCUMENTS

| | | | |
|---|---|---|---|
| 4,668,888 | 5/1987 | Tamura et al. | 310/233 |
| 5,909,072 | 6/1999 | Müller | 310/68 B |

FOREIGN PATENT DOCUMENTS 58-108950   6/1983   Japan ..................................... 310/177

*Primary Examiner*—Nestor Ramirez
*Assistant Examiner*—Judson H. Jones
*Attorney, Agent, or Firm*—Sughrue, Mion, Zinn, Macpeak & Seas, PLLC

[57] ABSTRACT

Projections 30 of a commutator unit 23 formed on the radial line of slit center positions of commutator piece 26 arranged radially are inserted into through holes 22 made on the center axes of salient poles 19 arranged radially in an armature core 15 and a rotator with high position accuracy of center points with respect to the salient poles 19 is formed. A projection tip face 30c is positioned on a shaft 14 to accurate predetermined dimension A from the rear end of the shaft, whereby accuracy of play gap D can be improved. The commutator unit 23 is reinforced with the projections 30 and wrong form dimensions made due to heat deformation at the soldering treatment time can be prevented.

5 Claims, 5 Drawing Sheets

DC MOTOR

BACKGROUND OF THE INVENTION

1. Field of the Invention

This invention relates to a small brush motor and in particular to a structure of a rotator containing an armature and a commutator unit.

2. Related Art

A rotator 100 in a small brush motor of a general 2-3 (2-magnetic-pole-3-salient-pole) structure shown in FIG. 9 comprises an armature core 101 with coil windings 110 different in phase wound around three salient poles 102, a commutator unit 106 having three commutator pieces 103 separated by a slit 104, and a shaft 105 onto which the armature core 101 and the commutator unit 106 are fitted. The energization change timing accuracy of the small brush motor for the coil winding 110 of each phase is affected mainly by the alignment accuracy between a center line P1 of the salient pole 102 and a center line P2 of the slit 104. Therefore, if the center lines P1 and P2 are out of alignment in the circumferential direction, the energization change timing accuracy for the coil windings 110 worsens, resulting in an increase in cogging and torque ripple.

Then, formerly, when the commutator unit 106 was pressed into the shaft 105, a jig, etc., was used for performing rough positioning.

In the small brush motor, a slight space S in a thrust direction is provided between the rotator 100 and a motor case 107. As shown in FIG. 10, the dimensions between the space S are adjusted according to the dimensions of the inner bottom face of the motor case 107 and the projection of an insulator 108 of the armature core 101, or the thickness of an adjustment plate 109 sandwiched between one end part of the shaft 105 and the motor case 107.

Further, to wind the coil winding 110 around the salient pole 102 of the armature core 101, an annular base 110 for joining the salient poles 102 is not provided with a member for supporting a winding end part 112 of the coil winding 110. If free winding is executed with a coil winder, the coil winding 110 may be shifted into the base 111, causing winding break.

Moreover, as shown in FIG. 11, a collar 117 of a commutator holder 115 is molded thin and if the press force of a soldering iron 114 is too large or the crimping time of the soldering iron 114 is too long in soldering work for electrically connecting the coil winding 110 to a riser 113, the riser 113 is bent in the arrow B direction or if the commutator holder 115 is made of a synthetic resin, heat deformation H is easily caused.

As described above, in the small brush motor of a general 2-3 (2-magnetic-pole-3-salient-pole) structure, an effect can be produced by rough positioning with a jig, etc., when the commutator unit 106 is pressed into the shaft. However, with a small brush motor of a 4-6 (4-magnetic-pole-6-salient-pole) structure with a larger number of salient poles, the numbers of slits 104 and commutator pieces 103 are increased, thus the open angle of each commutator piece becomes a half or less and the contact area with the commutator holder 115 is decreased. Resultantly, the commutator pieces 103 easily fall down and the assembly accuracy of the commutator unit 106 and the position accuracy between the salient poles 102 of the armature core 101 and the commutator unit 106 are required to be stricter.

In the space S adjustment method in the related art, variations occur in a cumulative error of each dimension accuracy of the dimensions of pressing the armature core 101 into the shaft 105, the thickness of the armature core 101, the thickness of the insulator 108, and the thickness of the adjustment plate 109, thus it becomes difficult to provide accuracy. The effect largely appears particularly when the motor is flattened.

Further, for the winding break of the winding end part 112 in the base 111, the small brush motor of 2-3 structure, which has a small number of salient poles, is easily adjusted in a wide work space; with the small brush motor of 4-6 structure, the spacing between the salient poles becomes narrow and it becomes difficult to correct the winding break, thus the winding cannot be thickened and the motor characteristics may be adversely affected.

Moreover, the small brush motor of 4-6 structure is crowded with a large number of soldering work points for the riser 113 as compared with the small brush motor of 2-3 structure, thus is easily filled with the soldering heat and moreover the portion of the commutator holder 115 holing the riser 113 is thin. Thus, the commutator unit 106 easily undergoes heat deformation, it becomes difficult to maintain accuracy, and the motor characteristics cannot be held uniform.

SUMMARY OF THE INVENTION

It is therefore an object of the invention to provide a small brush DC motor of a 4-6 structure with high accuracy that can overcome all the above-described problems in a simple structure.

An aspect of the preset invention, there is provided a DC motor comprising:

a closed-end cylindrical case with a bottom and a drive magnet attached to an inner peripheral surface;

a rotator consisting of an armature core with coil windings, a shaft inserted into a shaft hole of the armature core, and a commutator unit;

a brush coming in sliding contact with the commutator unit;

through holes axially penetrating the armature core at positions distant from the shaft hole, said through holes provided with the armature core; and projections axially projecting toward the bottom of said case, said projections provided with the commutator, the projections of the commutator unit being inserted into the through holes of the armature core so that the commutator unit and the armature core are fixed each other.

As described above, for the DC motor according to the invention, the projections from the commutator unit formed on the center lines of the commutator piece slits arranged radially are inserted into the through holes made on the center lines of the salient poles arranged radially in the armature core and positioning is performed on the shaft for integration, thereby forming the rotator. Thus, the position relation between the salient poles of the armature core and the commutator pieces of the commutator unit can be set with high accuracy, whereby the energization change timing accuracy for the coil winding is enhanced and the motor characteristics are improved.

A play gap is provided between the tips of the projections of the commutator holder and the bottom of the case and a move of the rotator in a thrust direction is regulated within the space range, whereby the move range of the rotator in the thrust direction can be easily managed with good accuracy and motor performance can be made uniform.

The projections from the commutator unit penetrating the base of the armature core and projecting toward the bottom of the case regulate winding of wire around the base end part and prevent winding break. Thus, coil winding looseness occurrence is prevented and the number of turns can be increased stably and efficiently, improving the motor characteristics.

Further, the commutator holder parts for holding the risers are thermally and structurally reinforced with the commutator unit projections positioned immediately near the risers and fitted into the armature core and fixed. Thus, soldering treatment of coil windings to the risers can be executed without being concerned about heat deformation of the commutator unit and reliability for electric connection can be improved.

Further, the insulator is sandwiched between the armature core and the commutator holder and the projections of the commutator holder are inserted into the through holes made in the insulator and are fixed, whereby the insulator is easily held without shifting in the circumferential direction.

DETAILED DESCRIPTION OF THE PREFERRED EMBODIMENTS

Figure 1:
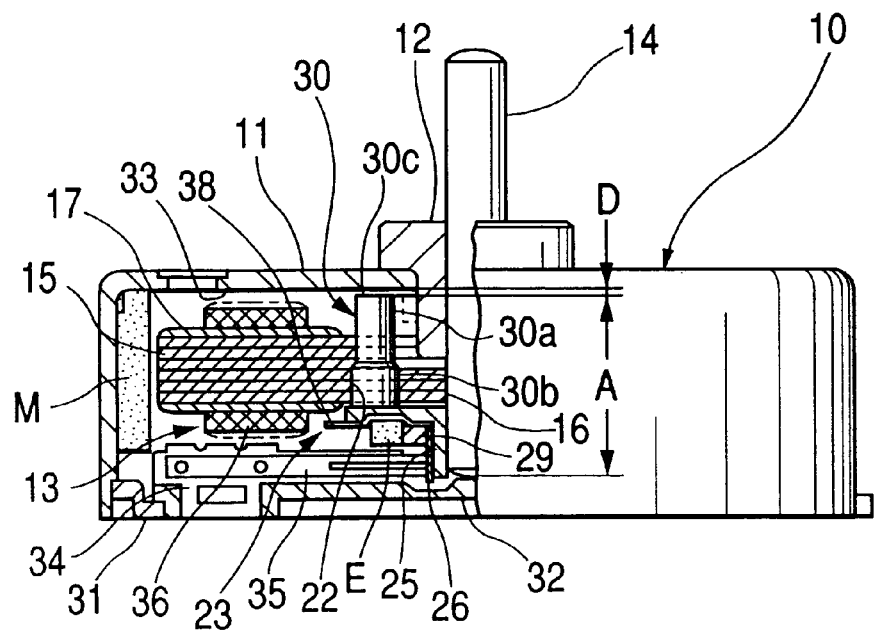
FIG. 1 is a side view of a DC motor according to the invention with one side shown in a sectional view.

An embodiment of a DC motor according to the invention will be discussed with reference to FIG. 1 to FIG. 8. FIG. 1 is a side view of one embodiment of a DC motor according to the invention with one side shown in a sectional view.

In FIG. 1, a closed-end cylindrical case 10 with a fixed magnet M attached to an inner peripheral wall is shown with a bottom 11 up. A bearing 12 is pressed into the center of the bottom 11 and is fixed for pivotally supporting a shaft 13 of a rotator 13 for rotation. A shaft hole 16 made at the center of an armature core 15 (see FIG. 2) is pressed into the shaft 14 for fixing the armature core 15 to a predetermined position in the axial direction of the shaft 14 and an insulator or an insulating layer 17 is applied to the surface.

Figure 2:
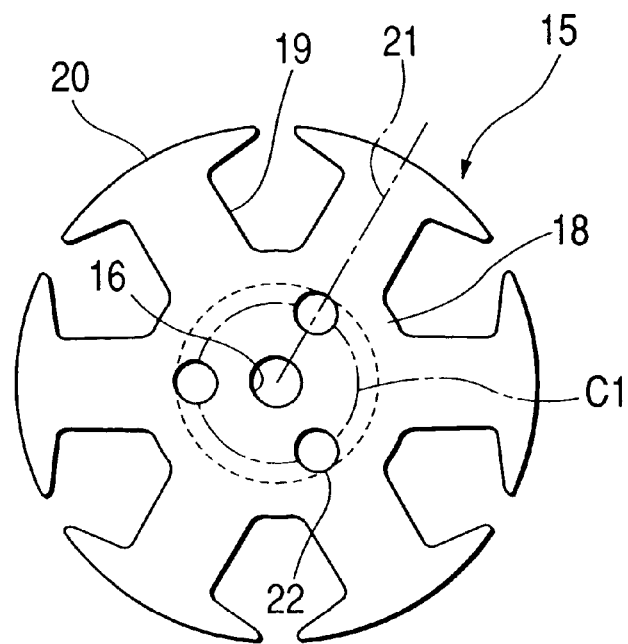
FIG. 2 is a plan view of an armature core of the DC motor according to the invention.

As shown in FIG. 2, the armature core 15 of small brush DC motor of 4-6 structure is provided with six salient poles 19 projecting radially from a base 18 with an equal spacing and a bow-shaped part 20 is expanded at the outer end of each salient pole 19. The base 18 is formed with three through holes 22 (in FIG. 2) of the same diameter parallel with the shaft hole 16 matched precisely with a geometrical center axis 21 of each salient pole 19 in a plane figure and at the same pitch interval on a circumference C1 having the same center as the shaft hole 16.

Figure 3:
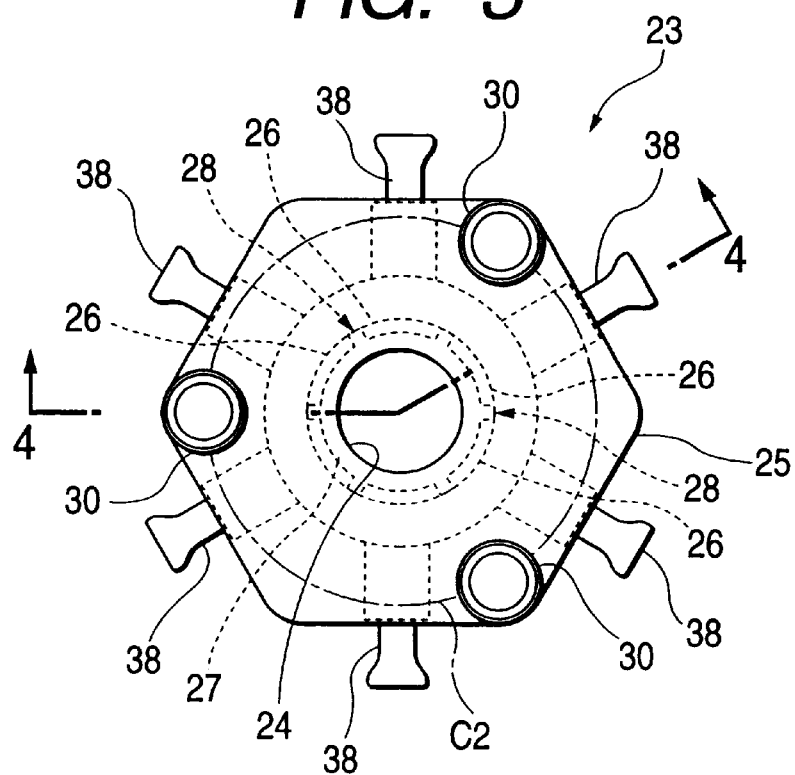
FIG. 3 is a plan view of a commutator unit of the DC motor according to the invention.

Next, a center hole 24 of a commutator unit 23 (see FIG. 3 and FIG. 4) is pressed into the shaft 14 and is engaged with the base 18 of the armature core 15. As shown in FIG. 3, the commutator unit 23 of the small brush DC motor of 4-6 structure holds six commutator pieces 26 molded integrally with a commutator holder 25 made of a synthetic resin molded article. The commutator pieces 26 are spaced equally from each other on a cylinder part side 27 of the commutator holder 25 and a slit 28 is formed at a predetermined distance kept between the adjacent commutator pieces 26 for electrically insulating the commutator pieces. Numeral 29 is a hold ring for preventing the commutator piece 26 from being detached and E is a varistor diode for extinguishing spark arcs.

The slits 28 must be engaged with the armature core 15 with the center positions of the slits precisely matched with the axes 21 of the salient poles 19. That is, the allowable shift (deflection angle) difference between the slit and the salient pole axis for a small brush DC motor of 2-3 structure is 3° or less; preferably, that for the small brush DC motor of 4-6 structure is 1.5° or less.

Then, in the plane containing the center line of the commutator holder 25 and the center positions of the slits 28, projections 30 having centers on a circumference C2 of the same diameter as a pitch circumference C1 of the through holes 22 are molded integrally on the opposite side to the holding side of the commutator pieces 26. A tip 30a of the projection 30 is a little narrower than the inner diameter of the through hole 22 and a base 30b of the projection 30 has an outer diameter fitted into the through hole 22.

Before the center hole 24 is fitted into the shaft 14, the tips 30a of the projections 30 are guided into the through holes 22 of the armature core 15 for positioning the commutator unit 23. Then, the center hole 24 of the commutator holder 25 is pressed into the shaft 14.

Figure 6:
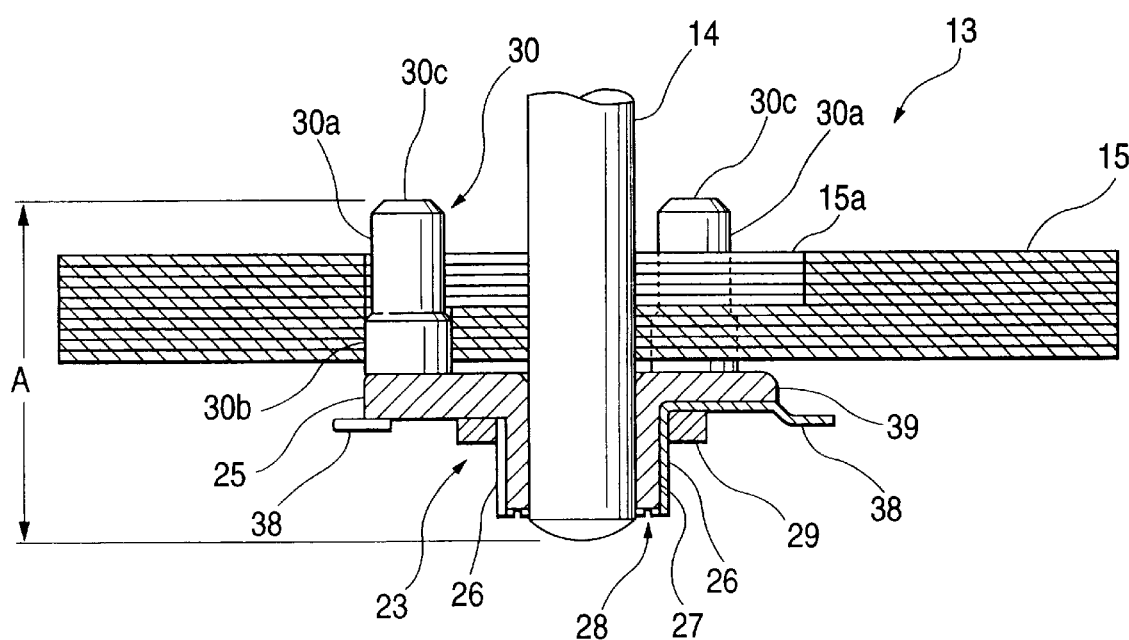
FIG. 6 is a schematic representation to show a completion state of engagement of the commutator unit and the armature unit in the DC motor according to the invention.

Finally, the bases 30b of the projections 30 are pressed into the through holes 22 before arriving at the position of a predetermined dimension A shown in FIG. 6, the commutator piece slits 28 of the commutator unit 23 maintain the alignment relation with the axes 21 of the salient poles 19, and the commutator unit 23 can be fixed to the shaft 14 at a position where the distance between the rear end of the shaft 14 and a projection tip face 30c is the predetermined dimension A. At this time, the tips 30a of the projections 30 penetrate the armature core 15 and project to the output side of the shaft 14.

In FIG. 6, the armature core 15 is formed at the center with a stepped part 15a which is axially thin. The projections 30 of the commutator holder 25 penetrate the through holes 22 of the armature core 15 and with the tips 30a not projecting from the upper end face of the armature core 15, good couple relation between the commutator unit 23 and the armature core 15 is maintained.

Referring again to FIG. 1, when the case 10 and a lid 31 are combined, if at least the distance accuracy between a thrust bearing part 32 of the lid 31 and a bottom 33 of the case 10 is always provided, the rear end of the shaft 14 is regulated by the bearing part 32. Thus, the predetermined distance A in the axial direction is set only at one point on the shaft 14, whereby an optimum play gap D for determining a rattle in the thrust direction of the projection tip face 30c and the bottom 33 can be provided. A brush holder 34 is fixed to the lid 31 for holding a power feed brush 35 coming in sliding contact with the commutator pieces 26.

Figure 7:
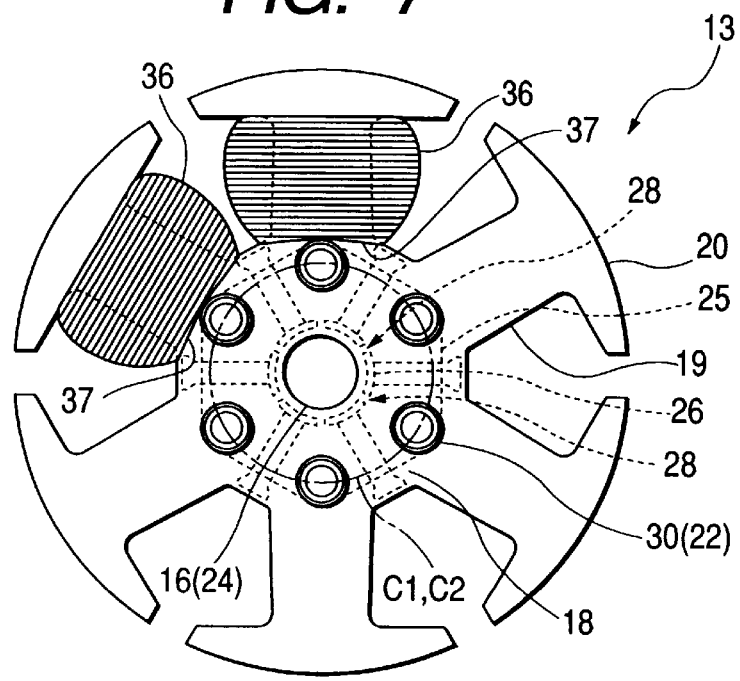
FIG. 7 is a plan view to show the relationships among projections of the commutator unit, windings, and risers in the DC motor according to the invention.

Next, other embodiments of the DC motor according to the invention will be discussed with reference to FIG. 7 and FIG. 8. In the embodiment in FIG. 7, a through hole 22 is made in each salient pole 19 of an armature core 15 of a 4-6 structure and the inner diameter of the through hole 22 is placed along the boundary between a base 18 and the salient pole 19.

On the other hand, a commutator unit 23 is formed with six projections 30 projected along the radial extension containing the center positions of slits 28. If the armature core 15 and the commutator unit 23 are engaged into a shaft 14 as in the above-described embodiment, base end parts 37 of coil windings 36 can be regulated on sides of the projections 30. Therefore, wire can be wound thick without producing looseness at the base end part 37 and a larger number of turns can be made in a limited space, improving the motor output efficiency. In FIG. 7, schematically the coil windings 36 are applied only to two salient poles 19, but wire is also wound around other salient poles 19, needless to say.

Figure 4:
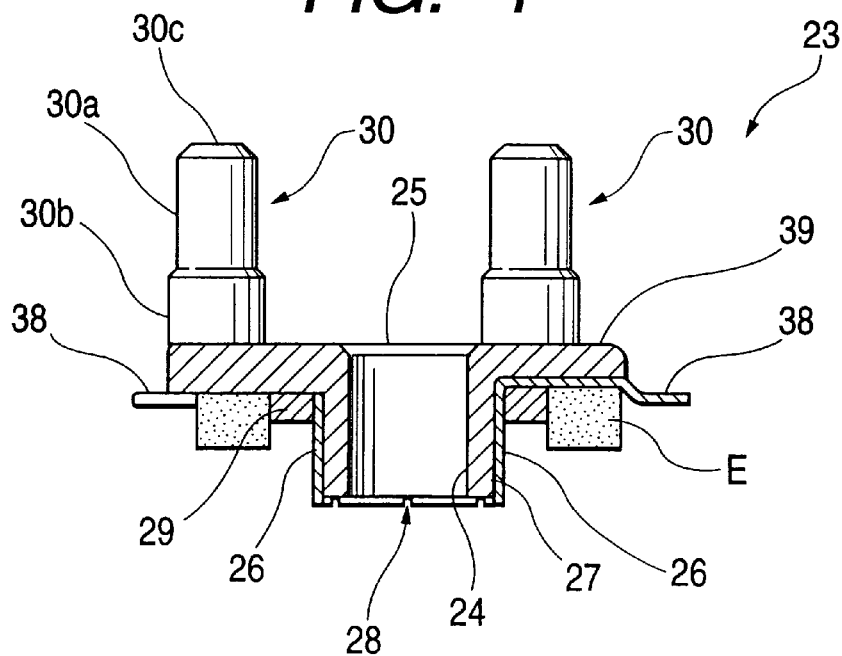
FIG. 4 is a sectional side view of the commutator unit taken on line 4—4 in FIG. 3.
Figure 5:
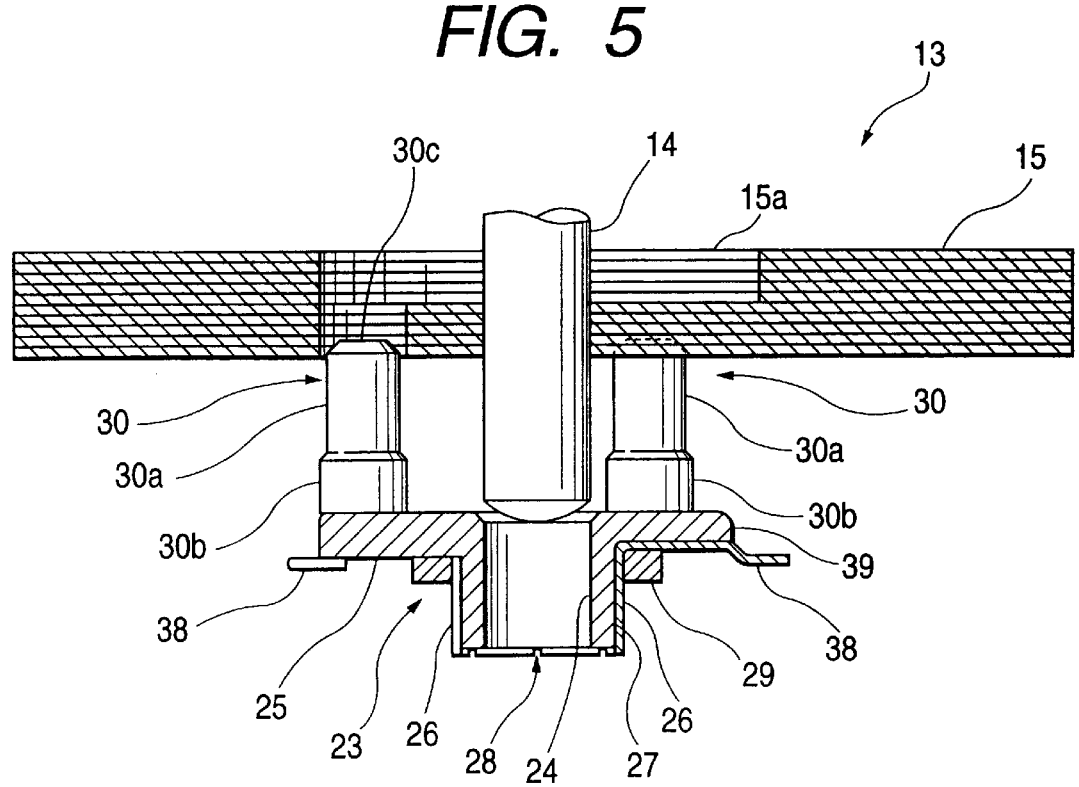
FIG. 5 is a schematic representation concerning engagement of the commutator unit and the armature unit in the DC motor according to the invention.

Further, as seen in FIG. 4, risers 38 project radially on the radial extension of commutator pieces 26 as terminals electrically integrated with the commutator pieces 26 for electric connection to the coil windings by soldering work. Although a flange part 39 of commutator holder 25 holding the risers 38 is thin, each riser 38 is also structurally reinforced on both sides of the rear with the projection 30 having a large thermal capacity and moreover the projection 30 is fitted into the through hole 22, is fixed to the armature core 15, and functions effectively as an anchor. Thus, deformation caused by soldering work treatment heat can be prevented.

In each of the embodiments, the invention is applied to the DC motor of a 4-6 structure comprising drive magnet M having four magnetic poles and the armature core 15 having six salient poles 19. According to the structure, the number of energization changes to the coil winding 36 increases, thus an about 30% torque increase can be intended as compared with the DC motor of a 2-3 structure. In contrast, to provide an equal torque, the motor size can be miniaturized as the number of energization changes increases.

Figure 8:
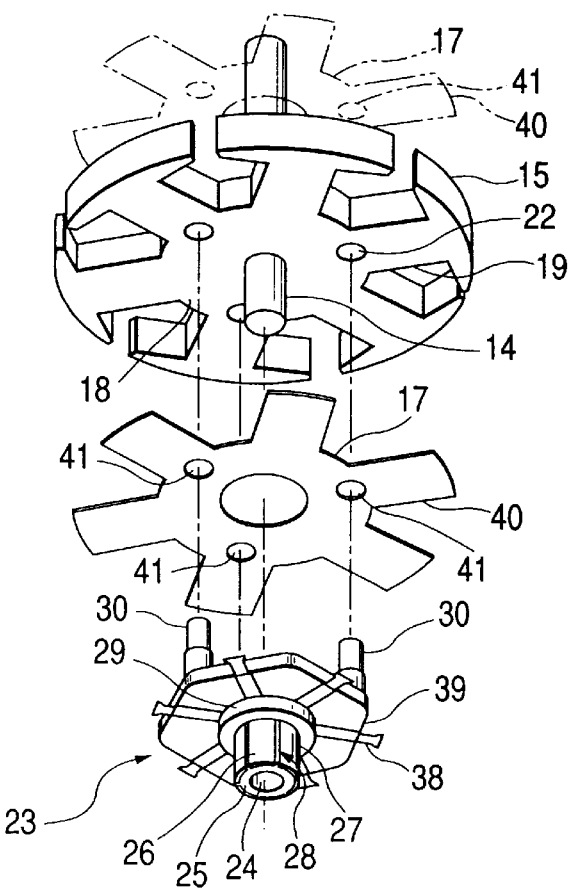
FIG. 8 is a perspective view to describe another embodiment using an insulator in the DC motor according to the invention.
Figure 9:
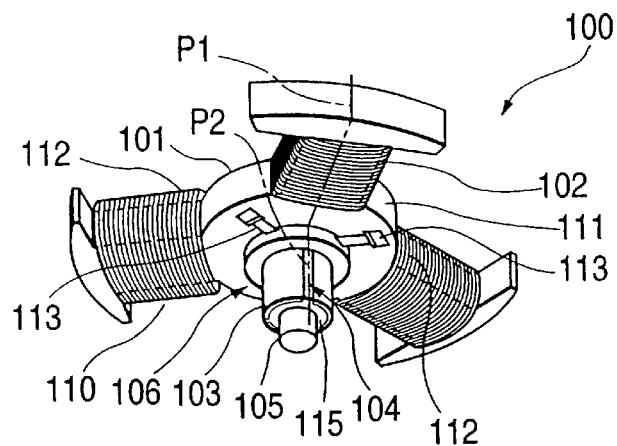
FIG. 9 is a schematic perspective view to show a rotator of a brush DC motor of a 2-3 structure in a related art.
Figure 10:
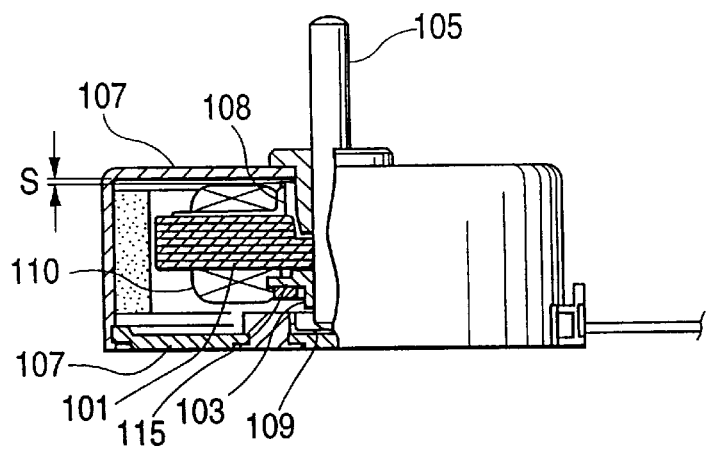
FIG. 10 is a side view of the DC motor in the related art with one side shown in a sectional view.
Figure 11:
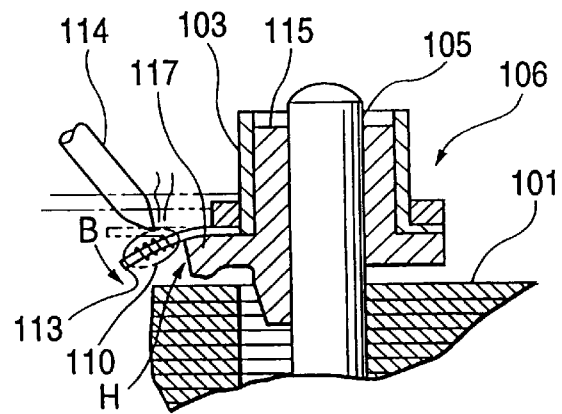
FIG. 11 is a sectional side view to describe soldering work of a riser and coil winding in the DC motor in the related art.

In an embodiment in FIG. 8, an insulator 17 is used to insulate wire wound around each salient pole 19 from the salient pole 19. The insulator 17 is similar to an armature core 15 in a plane figure and comprises radial projection pieces 40 matching the salient poles 19 and a little wider than the salient poles 19. Through holes 41 are made in the insulator 17 at positions corresponding to through holes 22 of the armature core 15. The through holes 41 are inserted into the projections 30 and the insulator 17 is fitted into the armature core 15, whereby the alignment relation of the insulator 17 with the salient poles 18 at fixed positions is held with good accuracy and a shift in the circumferential direction is not caused. Therefore, fear of an insulating failure or line break involved in winding wire by a coil winder to form coil windings 36 can be solved and the step time can be shortened.

As described above, for the DC motor according to the invention, the projections from the commutator unit formed on the center lines of the commutator piece slits arranged radially are inserted into the through holes made on the center lines of the salient poles arranged radially in the armature core and positioning is performed on the shaft for integration, thereby forming the rotator. Thus, the position relation between the salient poles of the armature core and the commutator pieces of the commutator unit can be set with high accuracy, whereby the energization change timing accuracy for the coil winding is enhanced and the motor characteristics are improved.

A play gap is provided between the tips of the projections of the commutator holder and the bottom of the case and a move of the rotator in a thrust direction is regulated within the space range, whereby the move range of the rotator in the thrust direction can be easily managed with good accuracy and motor performance can be made uniform.

The projections from the commutator unit penetrating the base of the armature core and projecting toward the bottom of the case regulate winding of wire around the base end part and prevent winding break. Thus, coil winding looseness occurrence is prevented and the number of turns can be increased stably and efficiently, improving the motor characteristics.

Further, the commutator holder parts for holding the risers are thermally and structurally reinforced with the commutator unit projections positioned immediately near the risers and fitted into the armature core and fixed. Thus, soldering treatment of coil windings to the risers can be executed without being concerned about heat deformation of the commutator unit and reliability for electric connection can be improved.

Further, the insulator is sandwiched between the armature core and the commutator holder and the projections of the commutator holder are inserted into the through holes made in the insulator and are fixed, whereby the insulator is easily held without shifting in the circumferential direction.

What is claimed is:

1. A DC motor comprising:
   a closed-end cylindrical case with a bottom and a drive magnet attached to an inner peripheral surface;
   a rotator consisting of an armature core with coil windings, a shaft inserted into a shaft hole of the armature core, and a commutator unit;
   a brush coming in sliding contact with the commutator unit;
   through holes axially penetrating the armature core at positions distant from the shaft hole, said through holes provided with the armature core; and
   projections axially projecting toward the bottom of said case, said projections provided with the commutator, the projections of the commutator unit being inserted into the through holes of the armature core so that the commutator unit and the armature core are fixed each other.

2. A DC motor as claimed in claim 1 further comprising:
   a space defined between tips of the projections of the commutator unit and the bottom of said case; and
   wherein a move of said rotator in a thrust direction is regulated within a range of the space.

3. A DC motor as claimed in claim 1, wherein the through holes of the armature core are formed in a base for joining salient poles, and the projections of the commutator unit project from the through holes and are erected at positions for regulating base end sides of coil windings around the salient poles of the armature pole.

4. A DC motor as claimed in claim 1, wherein the commutator unit has a flange where the projections are erected, wherein said rotator has an insulator sandwiched between the armature core and the flange, and the projections of the commutator unit are inserted into through holes formed in the insulator so that the insulator is fixed between the armature core and the flange.

5. A DC motor as claimed in claim 1, wherein the armature core has six salient poles and the drive magnet has four magnetic poles.

* * * * *